(12) United States Patent
Kula

(10) Patent No.: US 12,549,540 B2
(45) Date of Patent: Feb. 10, 2026

(54) NETWORK TRAFFIC INTERCEPTION AND INSPECTION SYSTEM

(71) Applicant: Charles Schwab & Co., Inc, San Francisco, CA (US)

(72) Inventor: John Scott Kula, Sinking Spring, PA (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 392 days.

(21) Appl. No.: 18/551,040

(22) PCT Filed: Sep. 14, 2020

(86) PCT No.: PCT/US2020/050651
§ 371 (c)(1),
(2) Date: Sep. 18, 2023

(87) PCT Pub. No.: WO2022/055503
PCT Pub. Date: Mar. 17, 2022

(65) Prior Publication Data
US 2024/0305624 A1    Sep. 12, 2024

(51) Int. Cl.
*H04L 9/40* (2022.01)
(52) U.S. Cl.
CPC ................. *H04L 63/083* (2013.01)
(58) Field of Classification Search
CPC ..... H04L 63/083; G06F 16/958; G06F 21/606
See application file for complete search history.

(56) References Cited

U.S. PATENT DOCUMENTS

| 10,341,316 B2* | 7/2019 | Dvorák .................. G06F 21/34 |
| 12,217,258 B2* | 2/2025 | Gallagher ........... H04L 63/1466 |
| 2014/0282978 A1* | 9/2014 | Lerner .................. H04L 63/083 726/7 |
| 2018/0260565 A1 | 9/2018 | Wang et al. |
| 2018/0295137 A1 | 10/2018 | Zager et al. |

(Continued)

OTHER PUBLICATIONS

International Search Report and Written Opinion issued May 28, 2021 in International Application No. PCT/US2020/050651.

(Continued)

*Primary Examiner* — Pramila Parthasarathy
(74) *Attorney, Agent, or Firm* — Harness, Dickey & Pierce, P.L.C.

(57) ABSTRACT

An authentication system has instructions including, in response to receiving a page request, determining a page identifier based on the page request and comparing the page identifier to a set of pages. The instructions include, in response to the page identifier matching a first page of the set of pages, obtaining a first profile corresponding to the first page and retrieving the first page from a first website corresponding to the first page. The instructions include, based on the first page, generating a new page according to the first profile and transmitting the new page to the browsing device. The instructions include, in response to receiving a selection from the new page on the browsing device, forwarding login credentials of the first profile to the first website and, in response to receiving a return page from the first website, forwarding the return page to the browsing device for display.

19 Claims, 11 Drawing Sheets

(56) References Cited

U.S. PATENT DOCUMENTS

2020/0084225 A1  3/2020  McKendall et al.

OTHER PUBLICATIONS

P.Bradford Nance et al., 'An Integrated Two-Factor Authentication Solution Using Pulse Connect Secure and Apache HTTP Server', In: Technical Report, Oak Ridge National Lab. (ORNL)/TM-2020/1324, Jan. 20, 2020 [retrieved on May 21, 2021]. Retrieved from <https://www.osti.gov/biblio/1649375>.abstract; sections 1-3.3; and figure 2.

Xavier De Carne De Carnavalet,'Last-Mile TLS Interception: Analysis and Observation of the Non-Public HTTPS Ecosystem', In: Thesis (PhD) in Concordia Institute for Information Systems Engineering, May 2019 [retrieved on May 21, 2021]. Retrieved from <https://spectrum.library.concordia.ca/985632/>.sections 5.2.1-5.2.1.6, 5.2.2.3; and table 8.

International Preliminary Report on Patentability issued Mar. 7, 2023 in International Application No. PCT/US2020/050651.

\* cited by examiner

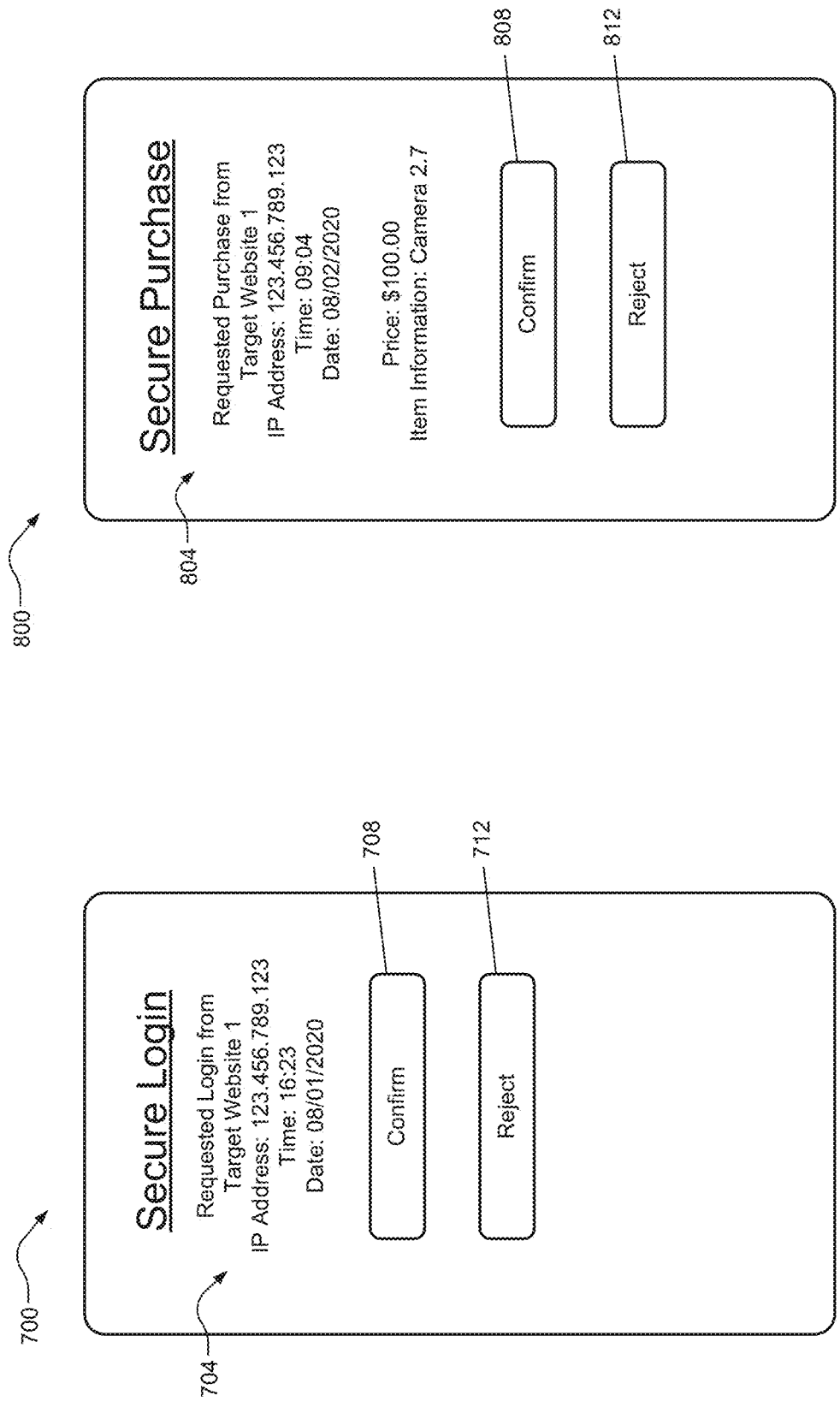

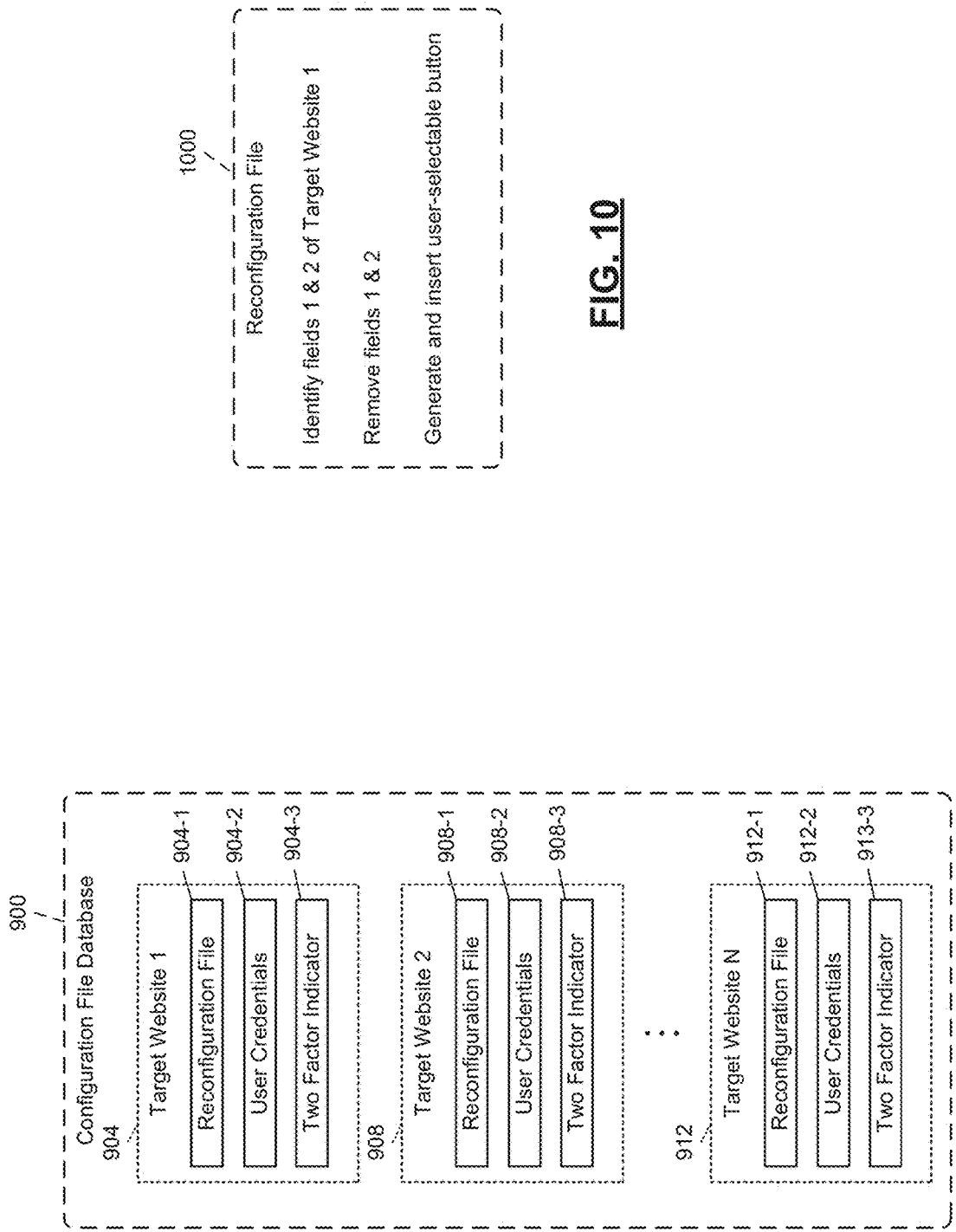

ly to network traffic interception using data-
NETWORK TRAFFIC INTERCEPTION AND INSPECTION SYSTEM

CROSS-REFERENCE TO RELATED APPLICATIONS

This application is a national phase under 35 U.S.C. § 371 of PCT International Application No. PCT/US2020/050651 which has an International filing date of Sep. 14, 2020, the entire contents of which are hereby incorporated by reference.

FIELD

The present disclosure relates to network security and more particularbase entries.

BACKGROUND

User devices are often infected with Trojans and other malware, which allow attackers to not only steal user credentials, but to leverage the user devices to commit fraud. Such an attack makes it difficult to identify the attacker because the attacker is connecting to websites with a known user device and corresponding user credentials.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a memory coupled to the at least one processor. The memory stores profiles. Each profile of the profiles corresponds to a page of a set of pages and includes login credentials for the corresponding page. The memory stores instructions for execution by the at least one processor. The instructions include, in response to receiving a page request from a browsing device, determining a page identifier based on the page request and comparing the page identifier to the set of pages. The instructions include, in response to the page identifier matching a first page of the set of pages of the profiles, obtaining a first profile corresponding to the first page and retrieving the first page from a first website corresponding to the first page. The instructions include, based on the first page, generating a new page according to the first profile and transmitting the new page to the browsing device. The instructions include, in response to receiving a selection from the new page on the browsing device, forwarding login credentials of the first profile to the first website. The instructions include, in response to receiving a return page from the first website, forwarding the return page to the browsing device for display on the browsing device.

In other features, the first profile of the profiles includes a reconfiguration file including instructions to generate the new page and an indication to enable or disable two-factor authentication. In other features, each of the profiles is implemented as a configuration file.

In other features, the instructions include, in response to the page identifier not matching at least one page of the set of pages of the profiles, redirecting the page request to a corresponding website and not performing HTTPS interception. In other features, the login credentials include a username and a password associated with a user of the browsing device.

In other features, the instructions include, before forwarding the login credentials of the first profile, forwarding a confirmation request to a confirmation device and, in response to receiving a confirmation indication from the confirmation device, forwarding the login credentials of the first profile to the first website. In other features, the browsing device and the confirmation device are at least one of: (i) a mobile phone, (ii) a tablet, (iii) a laptop, and (iv) a desktop.

In other features, the instructions include, in response to receiving a rejection indication from the confirmation device, forwarding a rejection screen to the browsing device for display on the browsing device. In other features, the instructions include, in response to the page identifier not matching at least one page of the set of pages, retrieving the first page from the first website and forwarding the first page to the browsing device.

In other features, each profile of the profiles corresponds to a user identifier. In other features, the instructions include, in response to the page request being received from a first user corresponding to a first user identifier, matching the first page to a subset of pages corresponding to the first user identifier.

In other features, the instructions include generating the new page by identifying a login portion of the first page, deleting the login portion, and adding a user-selectable button that, upon selection, transmits the selection from the browsing device. In other features, the instructions include, in response to the first profile excluding login credentials and including an indication to enable two-factor authentication, retrieving the first page from the first website and forwarding a confirmation request to a confirmation device.

A method includes, in response to receiving a page request from a browsing device, determining a page identifier based on the page request. Each profile of profiles corresponds to a page of a set of pages and includes login credentials for the corresponding page. The method includes comparing the page identifier to the set of pages and, in response to the page identifier matching a first page of the set of pages of the profiles, obtaining a first profile corresponding to the first page. The method includes retrieving the first page from a first website corresponding to the first page and, based on the first page, generating a new page according to the first profile. The method includes transmitting the new page to the browsing device and, in response to receiving a selection from the new page on the browsing device, forwarding login credentials of the first profile to the first website. The method includes, in response to receiving a return page from the first website, forwarding the return page to the browsing device for display on the browsing device.

In other features, the first profile of the profiles includes a reconfiguration file including instructions to generate the new page and an indication to enable or disable two-factor authentication. In other features, the method includes, in response to the page identifier not matching at least one page of the set of pages of the profiles, redirecting the page request to a corresponding website and not performing HTTPS interception.

In other features, the login credentials include a username and a password associated with a user of the browsing device. In other features, the method includes, before forwarding the login credentials of the first profile, forwarding a confirmation request to a confirmation device and, in response to receiving a confirmation indication from the confirmation device, forwarding the login credentials of the first profile to the first website.

In other features, the method includes, in response to receiving a rejection indication from the confirmation device, forwarding a rejection screen to the browsing device for display on the browsing device. In other features, the method includes, in response to the page identifier not matching at least one page of the set of pages, retrieving the first page from the first website and forwarding the first page to the browsing device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 7-8 are representations of example user interfaces displayed on a mobile device in communication with a security system according to the principles of the present disclosure.

FIG. 9 is an example configuration file database for a security system according to the principles of the present disclosure.

FIG. 10 is an example reconfiguration file of an example security inspection module.

In the drawings, reference numbers may be reused to identify similar and/or identical elements.

DETAILED DESCRIPTION

Figure 1:
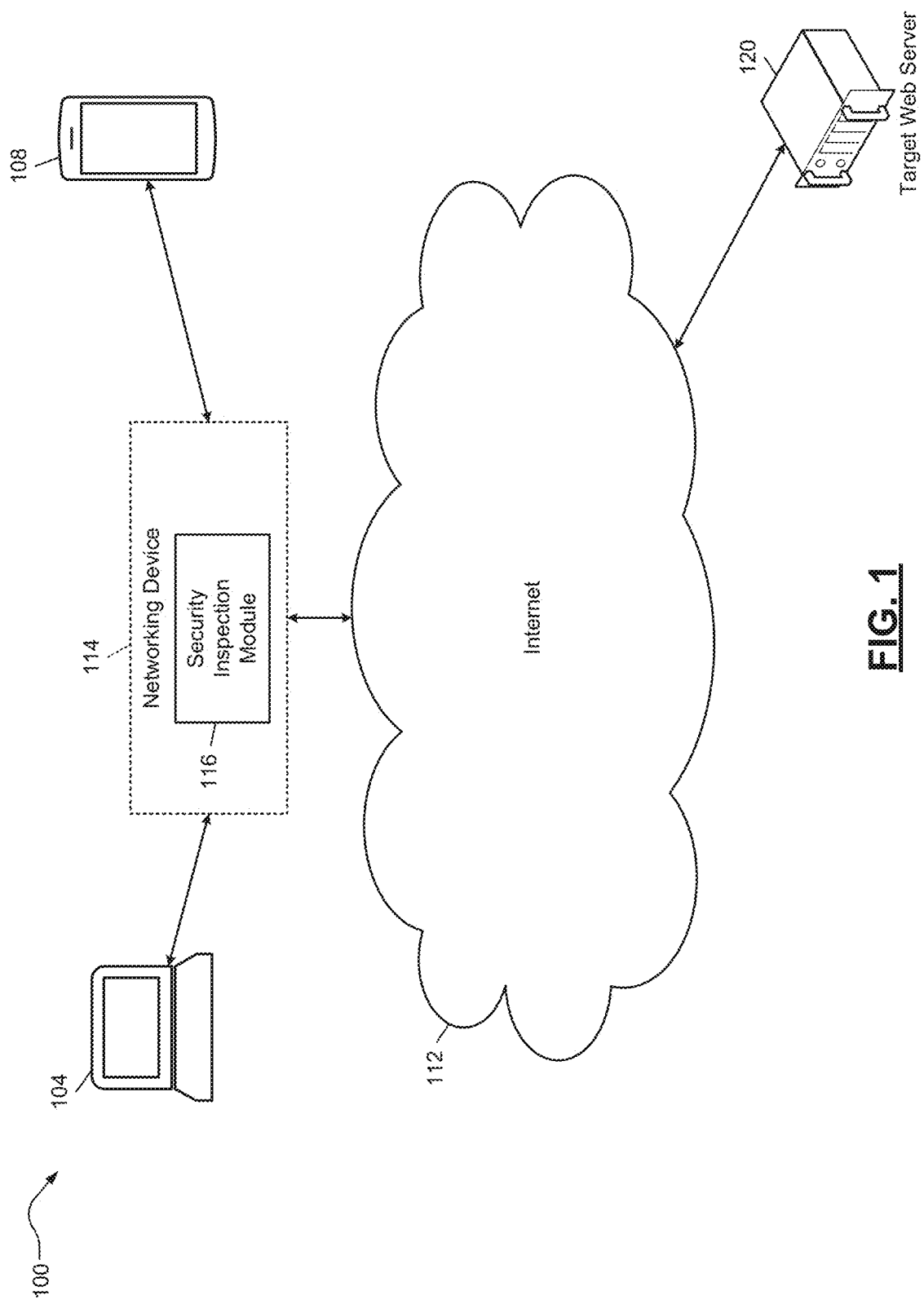
FIG. 1 is a high-level network diagram of an example security system.

A security system intercepts network traffic to identify when a user navigates to a login website and then provides user login credentials on behalf of the user, eliminating the need for the user to enter their login credentials and reducing the possibility of a malicious attacker scraping user credential data during a login. Further, the security system can include two-factor authentication on the user side when the login website has not implemented these protections. The security system may be implemented in a residential or commercial setting. The security system may be integrated in a router, gateway, firewall, etc., or may be implemented as a standalone proxy device. In various implementations, the security system may be operated by a third-party vendor outside the local area network of the user.

The security system solves the problem of exposing user entry of credentials to sniffing or capture while still facilitating login of the user to a target website. The security system intercepts traffic from a browsing device for example, a user device, such as a mobile phone, a tablet, a laptop, a desktop to a target website on the internet. In various implementations, the intercepted traffic may be limited to web traffic, such as by intercepting only transmission control protocol (TCP) ports 80 and 443.

As part of installing the security system, associated devices (including the browsing device) are configured to trust a certificate authority of the security system. The security system can then intercept even encrypted web traffic, using hypertext transfer protocol secure (HTTPS) interception—also known as secure sockets layer (SSL) decryption.

The security system includes profiles (which may be implemented as configuration files) for websites that the security system is responsible for authenticating to. The profile for a website may include reconfiguration parameters, user credentials, and an indication of whether to use two-factor authentication for logging in to the website. In various implementations, the profile may be specific to a certain page of the website, such as a login page. The user credentials are stored using strong encryption, which may rely on tokens stored within a hardware-based key manager that is isolated from the main processing circuitry of the security system.

When the security system intercepts a request by the browsing device to a target website, the security system identifies whether a corresponding profile is present for the target website. In various implementations, if the security system does not include a profile for the target website, the security system may redirect the browsing device directly to the target website and avoid HTTPS interception on the connection. This determination may be made based on the IP address of the target website. That is, the security system may include in the profiles an IP address of the corresponding target website and, if the IP address does not match one of the IP addresses included in one of the profiles, the security system determines that additional interception is not necessary, improving efficiency of the security system.

In various implementations, if the IP address of the target website is not recognized, HTTPS interception may be performed to identify the uniform resource locator (URL) in the website request, from which the website can be identified. Then, if the identified website does not match one of the target websites included in the profiles, the security system determines additional interception is not necessary, as described above.

If the security system includes a profile for the target website, the security system may establish a secure connection with the browsing device using the certificate authority of the security system, which the browsing device has been configured to trust. The security system also establishes a secure connection with the target website. The process of creating the two separate secure connections within the security system is referred to as HTTPS interception.

By intercepting the web traffic, the security system can determine which page of the target website is being requested by the browsing device. When the requested page corresponds to a profile (such as when the requested page is a login page), the security system can retrieve the requested page from the target website, modify the requested page, and return the modified page to the browsing device.

The profile may define how the requested page is to be modified. For example, the profile may include instructions to identify specific login fields within a hypertext markup language (HTML) file, remove the login user interface (UI) elements, and insert a user-selectable login button. The remainder of the requested page is left unchanged. For example only, the login UI elements may include a username textbox, a password textbox (in which entered characters are masked with asterisks), and a login button.

When the user sees the modified page on the browsing device, the user can actuate the login button. The login button sends a message (for example, an HTTP POST request) to the security system indicating the user's desire to log in to the target website. In response, the security system obtains the credentials corresponding to the target website and supplies them to the target website through the login UI elements of the original requested page.

In various implementations, the target website may then respond with a revised version of the requested webpage, where the login UI elements are gone and replaced by an indication that the user is logged in. The security system may be programmed to recognized the logged-in status and avoid modifying the page before relaying the page to the browsing device. In other implementations, the fact that the login UI elements are missing means that there is nothing to modify, so the security system does not need to be specifically configured to identify whether the user is logged in or not.

When the browsing device requests a page from the target website that does not correspond to a profile, the security system simply passes the requested page to the browsing device unchanged. On some websites, every page may have login UI elements until the user has logged in (for example, in the far-right side of a site banner present on every page). As a result, the profile for the website may be configured to encompass every page on the website—the security system replaces the login UI elements on every page.

The security system may also allow for the creation of two-factor (2FA) authentication, even when the target website does not implement 2FA. To configure 2FA for the security system, a designated device is defined. For example, the designated device may be a user device, such as a mobile phone, tablet, laptop, a desktop, etc. A security-system-specific application may need to be installed on the designated device. The user may be given advice that, generally, the designated device should be different than the primary browsing device. For example, the device most frequently used for browsing secure websites may be the user's laptop, while the user's mobile phone is chosen as the designated device.

When the security system identifies a login page, the security system may remove the login UI elements and insert a prominent message indicating that login can be performed using the designated device. The security system then passes the modified page to the browsing device and transmits a 2FA message to the designated device out-of-band (that is, not as part of the requested website page). When the designated device receives the 2FA message, the user can confirm whether login is desired. For example, the security-system-specific app may present the user with a notification that a login has been requested. When presenting the login request to the user, the app may provide identifying information such as a browsing device identifier (for example, a human-readable name such as "Amy's iPhone 5"), a timestamp, a target website identifier, etc. Through the app, the user can choose either a confirm button or a reject button.

The chosen response is sent back to the security system. In various implementations, the communication between the security system and the designated device is performed through a server operated by a provider of the security system. In other implementations, the communication may occur directly between the security system and the designated device, secured by, for example, a pre-shared key generated during initial setup of the security system.

In response to an approval by the user, the security system forwards the corresponding user credentials to the target website, which logs the user in to the target website. The security system receives a return page (a post-login page) from the target website and forwards the return page to the browsing device for user interaction as usual.

In various implementations, the security system may be configured to work with websites that provide their own 2FA. When 2FA is configured through a target website, the target website's profile may reflect this and disable the security system's own 2FA for that site. Then, for a login page, the security system submits user credentials as described above. The target website's 2FA implementation would then begin. For example, the user may need to supply a numeric code from a time-based one-time password (TOTP) app or a text message. Or, the user may need to perform a confirmation action in an authentication app, such as in response to a push notification.

In various implementations, the security system can be configured to not require 2FA upon login for a site (meaning the user can simply actuate the login button within the browsing device to log in) but to require 2FA for certain events, such as monetary transactions. For example, the 2FA confirmation from the designated device may be required in order to complete a purchase on a retail website, complete a trade on a financial website, etc. This may be implemented by setting the profile for the login page of the website to not require 2FA. Meanwhile, a profile can be created for the transaction page of the website (for example, a checkout page or trade confirmation page) with a 2FA requirement.

When the security system identifies the transaction page, the "Complete Purchase" or "Confirm Trade" UI elements can be removed and a notice inserted, such as "Confirm on designated device" or "Confirm on Amy's iPhone 5." The security system then sends a 2FA message out-of-band to the designated device. Once an approval is received from the designated device, the security system can actuate the "Complete Purchase" or "Confirm Trade" UI element.

In various implementations, the security system may include a virtual private network (VPN) server. During setup of the security system, the browsing device (and, in various implementations, the designated device) can be configured with a VPN client tied to the security system's VPN server. Then, when the browsing device is away from the local area network where the security system is located, traffic from the browsing device can still be inspected by the security system. In addition, the VPN functionality may enhance security by preventing any unencrypted traffic from traversing untrusted access points and networks (such as hotel networks and access points in airports).

In addition to security enhancements protecting against attackers, the present disclosure may also provide, explicitly or inherently, parental controls over purchases and logins. As a result, the present disclosure may form part of a parental monitoring software suite.

Because the security system is responsible for storing user credentials, the security system acts as a password manager, allowing for much more complex (and secure) passwords to be used. Even more importantly, the passwords are unique to each site. The security system may offer the ability to generate and periodically update passwords.

In FIG. 1, a security system 100 includes a browsing device 104 and a designated device 108, which connect to the internet 112 through a networking device 114. For example, the networking device 114 may be a router, a switch, a firewall, a gateway, etc. The networking device 114 may include a digital subscriber line (DSL) modem, a cable modem, etc.

A security inspection module 116 is shown being implemented within the networking device 114, but may be implemented separately. The networking device 114 may define the boundary of a local area network (LAN) in which the browsing device 104 and the designated device 108 are located in the example of FIG. 1. In various implementations, the security inspection module 116 may be located outside of the LAN and operated by a third party.

The security inspection module 116 intercepts traffic from the browsing device 104 before forwarding target website requests to a target website server 120 via the internet 112. Additionally, the security inspection module 116 intercepts traffic from the internet 112 directed to the browsing device 104 from, for example, the target website server 120.

The security inspection module 116 stores configuration files, each configuration file corresponding to a target website of a variety of target websites. In various implementations, the configuration files are instead a configuration database including configuration instructions for the variety of target websites in a single database or a single file. Upon installation of the security system 100, the user may select which websites the user would like the security inspection module 116 to intercept and post the user credentials for the user, for example, to log in. Additionally, the user can select which websites to require two-factor authentication for the user to proceed to the target website page.

In various implementations, the configuration files identify which websites the configuration files correspond to and include credential field codes used by the target website. For example, on a login page of target website 1, the user credential fields may be "username" and "password," while the user credential fields on a login page of target website 2 may be "email address" and "passcode." Therefore, each configuration file includes reconfiguration code to identify the fields on the target website page and rewrite the login portion of the target website page to remove the login fields and replace the login portion with a user-selectable button.

The security inspection module 116 also stores user credentials for the target website as well as an indication whether the user would like to enable two-factor authentication for the target website (unless the target website already includes two-factor authentication, in which case the option to enable two-factor authentication may be removed from the configuration file).

The security inspection module 116 includes template configuration files for a variety of target websites for the user to update with the corresponding user credentials and preferences. Additional configuration files may be added by the user or added by an intermittent update to the security inspection module 116.

Figure 2:
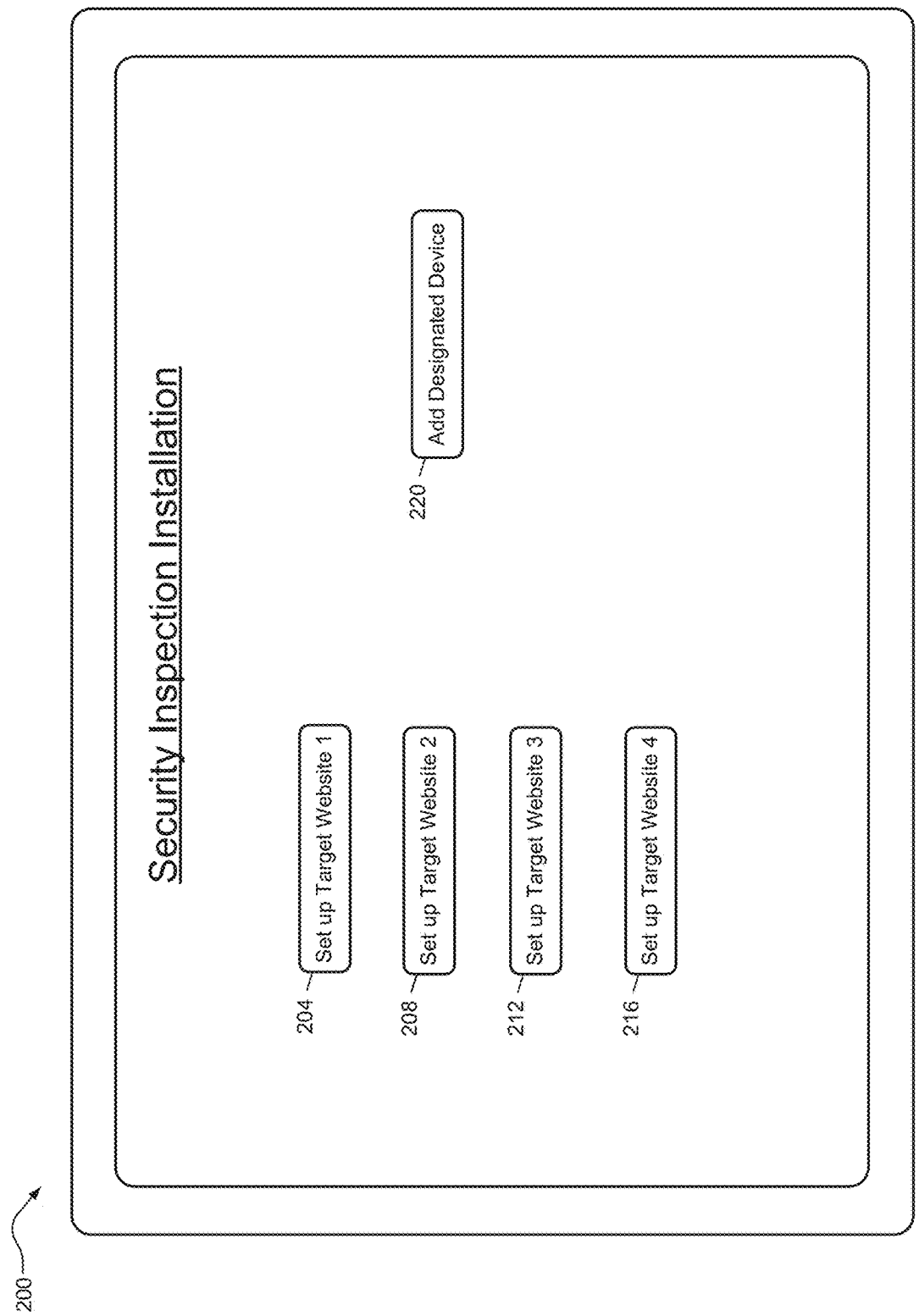
FIGS. 2-3 are representations of example user interfaces during configuration of a security system.
Figure 3:
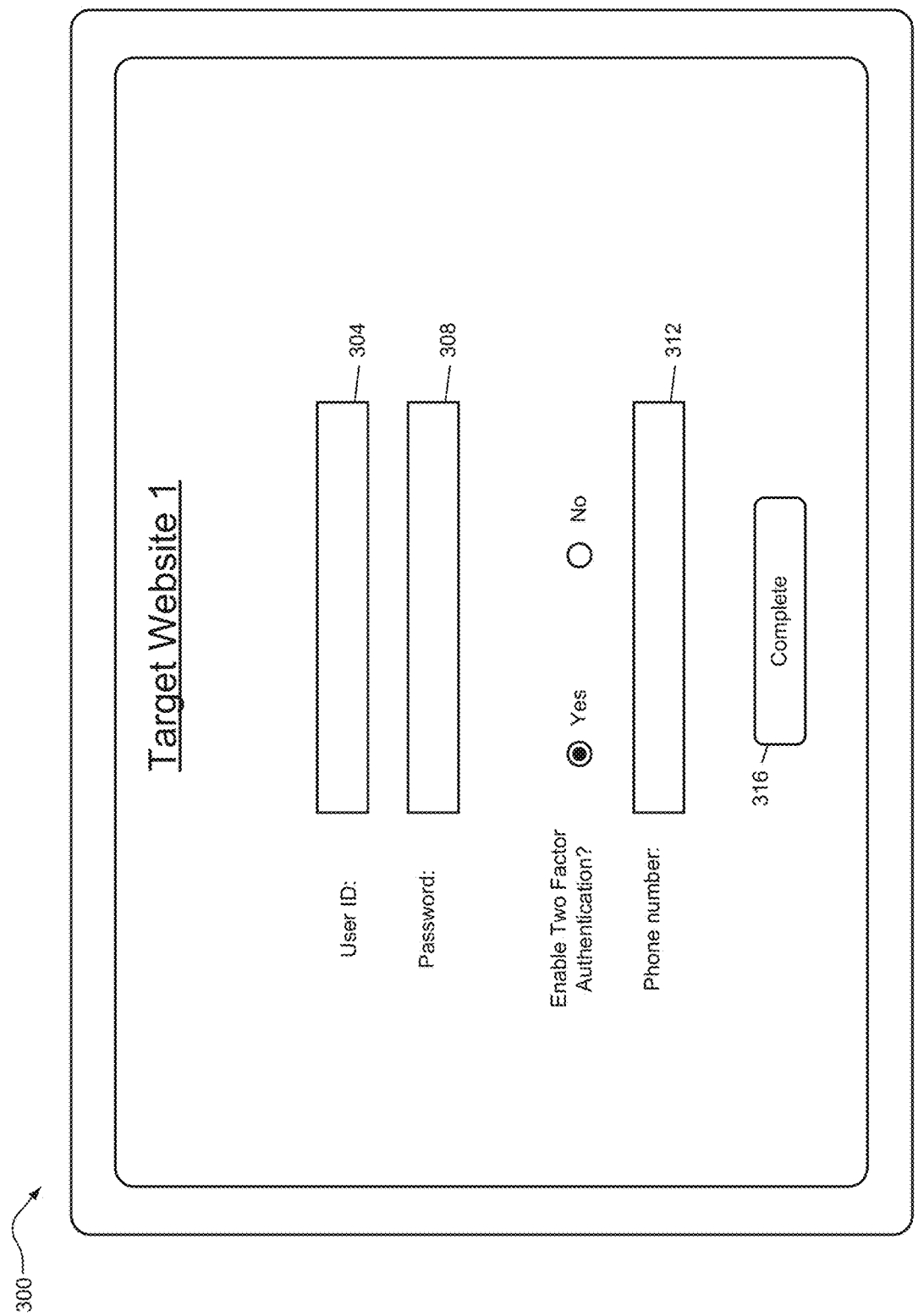

FIGS. 2-3 are representations of an example user interface during initial installation of a security system. FIG. 2 depicts an initial user interface 200 where the user can select to set up one of the target websites and can designate a user device as the designated device. As shown, a set of buttons are included on the initial user interface 200, including: a set up target website 1 button 204, a set up target website 2 button 208, a set up target website 3 button 212, and a set up target website 4 button 216. In various implementations, a dropdown menu or other display methods of additional target websites may be included. Upon selection of one of the set up buttons, the user is directed to input information on a subsequent user interface, show in FIG. 3.

In various implementations, the initial user interface 200 also includes an add designated device button 220, which, upon selection, directs a user to a code, such as a QR code, that the user can input to their designated device by typing in the code or by capturing the QR code using a camera of the designated device. In various implementations, the user can download a security inspection application on their designated device and set up the security inspection application using the code displayed on the browsing device.

FIG. 3 depicts a subsequent user interface 300 for target website 1 (upon selection of the set up target website 1 button 204 of FIG. 2). During installation, the user can enter in a user identifier field 304 their username or user identifier for target website 1 along with their password in a password field 308. Additionally, the user can select whether to enable two-factor authentication for the target website 1 by selecting one of the radio buttons indicating yes or no. While only radio buttons are shown, a dropdown menu and other implementations can be used.

In various implementations, if the target website 1 already conducts two-factor authentication, the subsequent user interface 300 corresponding to the target website may exclude the question regarding two-factor authentication. To enable two-factor authentication, the user can enter a corresponding phone number into a phone number field 312. Upon user selection of a complete button 316, the security system is set up for target website 1. In various implementations, while a template for a particular website may be available for the user to set up, the user can choose to not set up that particular website, and the security system will transmit the particular website for usual user interaction.

In various implementations, the system may accommodate creating multiple accounts for the same target website for example, a user may maintain multiple email addresses with an email service and/or the residence may have multiple users, each with their own email address at the same email service. Each user can save their respective credentials per account and selectively enable two-factor authentication for their accounts (which may be a per-user, per-account, or per-residence setting).

Figure 4:
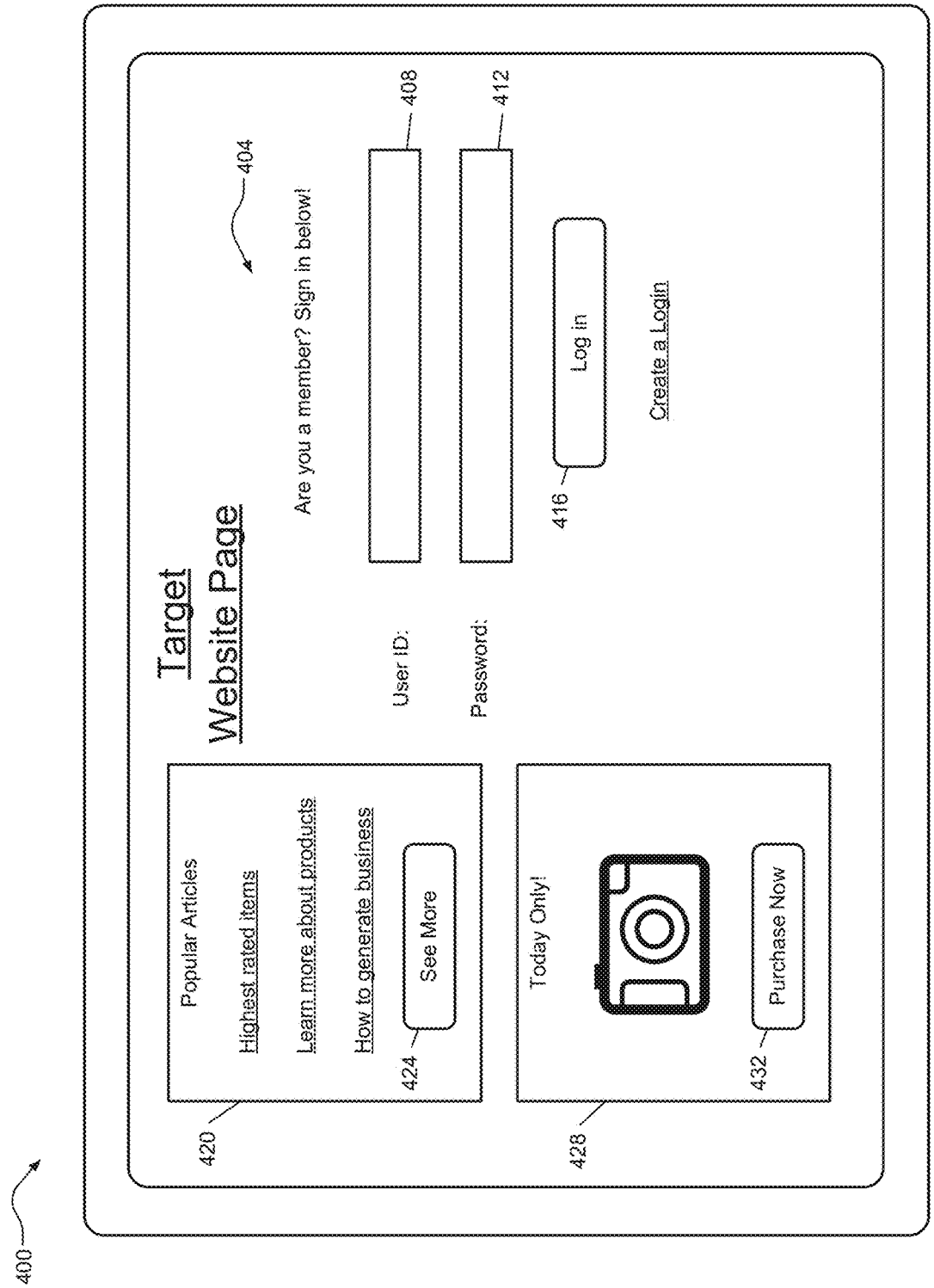
FIGS. 4-6 are representations of example user interfaces of a browsing device including a security system according to the principles of the present disclosure.
Figure 5:
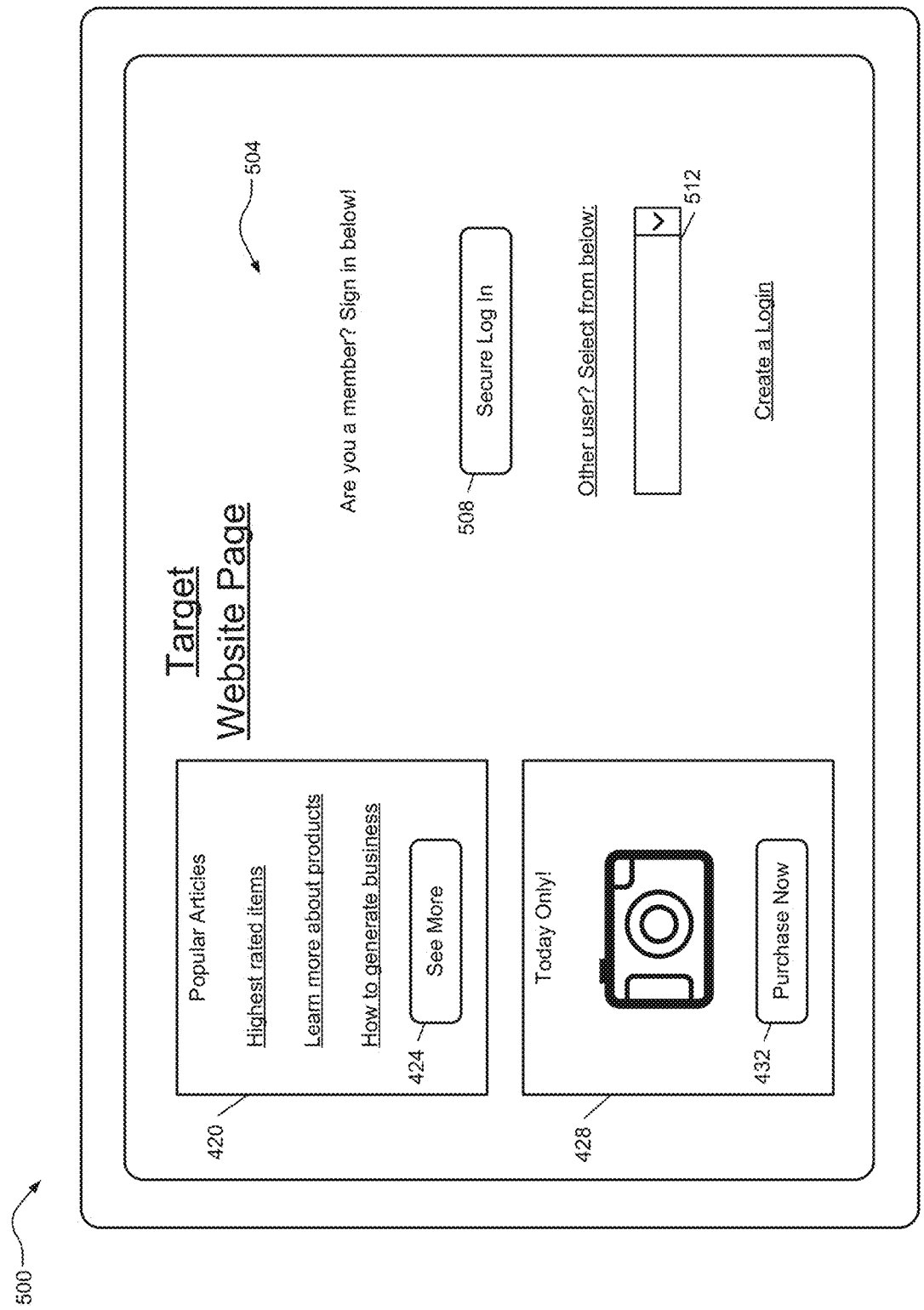
Figure 6:
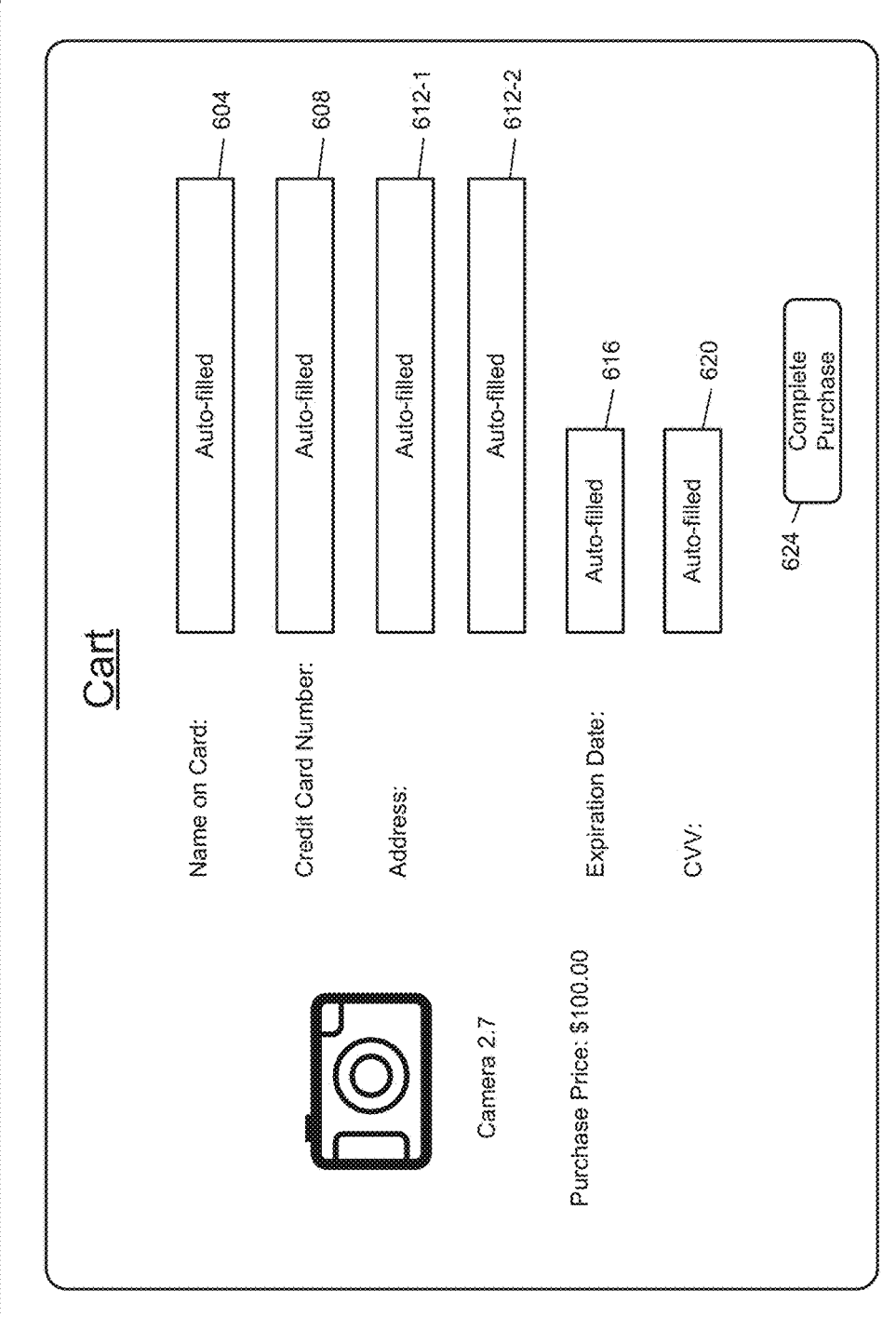

FIGS. 4-6 are representations of an example user interface of a browsing device including a security system. FIG. 4 depicts a target website page 400 without a configuration file including a rewrite instruction within the security system. That is, FIG. 4 depicts the target website page 400 without any changes being made by the security system. The target website page 400 includes a login portion 404, including a user ID field 408 and a password field 412 for the user to enter their credentials and select a login button 416 to log in to the target website.

The target website page 400 includes a popular articles section 420, including a see more button 424. Additionally, the target website page 400 includes a deals section 428, including a purchase now button 432.

FIG. 5 depicts a generated login page 500. The generated login page 500 is generated based on the target website page 400 of FIG. 4 and using a corresponding configuration file of the security system. The generated login page 500 includes the same features of the target website page 400 of FIG. 4 (such as the popular articles section 420 and the deals section 428).

However, the generated login page 500 includes a rewritten login portion 504. The corresponding configuration file includes instructions to identify the login portion 404 of FIG. 4, remove the field entry portions, and replace the field entry portions with a secure login button 508. In this way, the user avoids entering their corresponding user credentials, improving user experience and reducing the possibilities of a malicious attacker collecting the user's user credentials for the target website page.

In various implementations, the generated login page 500 may include a dropdown menu 512 from which to select a user ID for the user logging on. The dropdown menu 512 is implemented when multiple profiles have been created for the target website. The corresponding configuration file for the target website may include user IDs for the multiple profiles to allow for generating the login page including the dropdown menu 512 (or other appropriate user interface element) with the corresponding user IDs. In various implementations, when the user sets up a profile, the user can label their user ID with a nickname that is displayed in the dropdown menu 512 and corresponds to the account's login credentials.

FIG. 6 depicts a purchase page 600. For example, the user may be directed to the purchase page 600 upon selection of the purchase now button 432. As mentioned previously, the security system may be configured to require two-factor authentication when completing a transaction, such as a purchase. For websites that store a user's transaction details, such as a credit card number, the website may auto complete, on the purchase page 600, a name on card field 604, a credit card number field 608, an address field 612-1 and 612-2, an expiration date field 616, and a card verification value field 620, allowing for easier purchase. Once installed and upon selection of a complete purchase button 624, the security system forwards a message out-of-band to the designated device to confirm that the user is purchasing the product to realized two-factor authentication. The security system similarly requires confirmation from the designated device after posting user credentials for the user to log in to the target website page.

In various implementations, multiple cards may be stored for multiple users. The cards may be stored in a corresponding user profile. In various implementations, the purchase page 600 may be generated similarly to the login page of FIG. 5. Therefore, once the card information is retrieved, the purchase page 600 may be generated to exclude fillable fields and include a purchase button. In such implementations, as described above, the purchase page 600 may include a dropdown menu or other user interface (UI) element that allows the user to select which card to use for the purchase. Each card may also be given a nickname upon configuration and correspond to a specific phone number to perform two-factor authentication.

FIGS. 7-8 are representations of an example user interface of a mobile device included in a security system. FIG. 7 depicts a secure login interface 700 on the designated device. As described above, the security system sends a message out-of-band to the designated device, resulting in the secure login interface 700 on the designated device. In various implementations, the designated device may include a security inspection application downloaded on the designated device to receive and display the message.

As shown on the secure login interface 700, the message includes information related to the attempted login 704, including the target website, an IP address, a time, and a date. The secure login interface 700 also includes a confirm button 708 and a reject button 712. Upon user selection of the confirm button 708, the designated device forwards the approval to the security inspection module 116 of FIG. 1, instructing the security inspection module 116 to post the corresponding user credentials to the target website. However, if the user selects the reject button 712, the login attempt is rejected. In various implementations, the browsing device may display an indication that the login attempt was rejected.

FIG. 8 is a secure purchase interface 800, as described in FIG. 6, depicting when the user has enabled two-factor authentication for transactions on a particular website by the security system. If two-factor authentication is enabled for the target website upon, for example, a purchase now button being selected, the security inspection module 116 of FIG. 1 forwards a message out-of-band to the designated device. When the user opens the security inspection application, the designated device displays the secure purchase interface 800, including information regarding the transaction 804, a confirm button 808, and a reject button 812. The information regarding the transaction 804 may include the target website, an IP address, a time, a date, and transaction information, such as a purchase price and an item being purchased.

As described in FIG. 7, upon selection of the confirm button 808, the designated device forwards an approval to the security inspection module 116 of FIG. 1 to complete the purchase. For two-factor authentication of a transaction, the security system may only allow the purchase to complete upon approval from the designated device. In various implementations, the security inspection module 116 of FIG. 1 may store transaction details, such as credit card information, or even simply a credit validation value, to post to the target website and complete the purchase or transaction.

FIG. 9 is an example configuration file database included in an example security system. A configuration file database 900 stores unique information for each stored target website set up upon installation of the security system. In various implementations, the configuration file database 900 stores data for individual pages of target websites. The configuration file database 900 stores data for target website 1 904, target website 2 908, . . . , and target website N 912. Each stored website includes a reconfiguration file 904-1, 908-1, and 912-2; user credentials 904-2, 908-2, and 912-2; and a two-factor indicator 904-3, 908-3, and 912-3. In various implementations, the configuration file database 900 stores a single file including reconfiguration information for target websites and corresponding pages of the target websites.

As noted previously, the reconfiguration file 904-1, 908-1, and 912-2 includes instructions for the security inspection module to rewrite or generate the new page, removing the original login portion prompting users for user credentials and replacing the original login portion with a user-selectable button for the user to select if the user is attempting to log in to the target website. The user credentials 904-2, 908-2, and 912-2 are input by the user when installing the security system. The two-factor indicator 904-3, 908-3, and 912-3 is selected by the user during installation too, allowing the user to decide if two-factor authentication is used for the target website. In various implementations, the configuration file database 900 may include only the two-factor indicator 904-3, 908-3, and 912-3 for websites that allow the user to perform a transaction, as discussed previously, as user credentials and a reconfiguration file would not be used in such an implementation.

FIG. 10 is an example reconfiguration file of an example security inspection module. A reconfiguration file 1000 includes lines of instructions or code, for example, HTML code. The reconfiguration file 1000 includes code to identify entry fields, such as a first field requesting a username and a second field requesting a password, for a target website. The reconfiguration file 1000 also includes code instructing the removal of those identified fields and code instructing the generation or addition of a user-selectable button in place of the identified fields.

As mentioned previously, in various implementations, the security inspection module may be a stand-alone proxy separate from the router. Further, when multiple users are associated with the same router or the same stand-alone proxy, each user may set up a user profile and corresponding configuration files that are associated with the user's browsing device and designated device.

Figure 11:
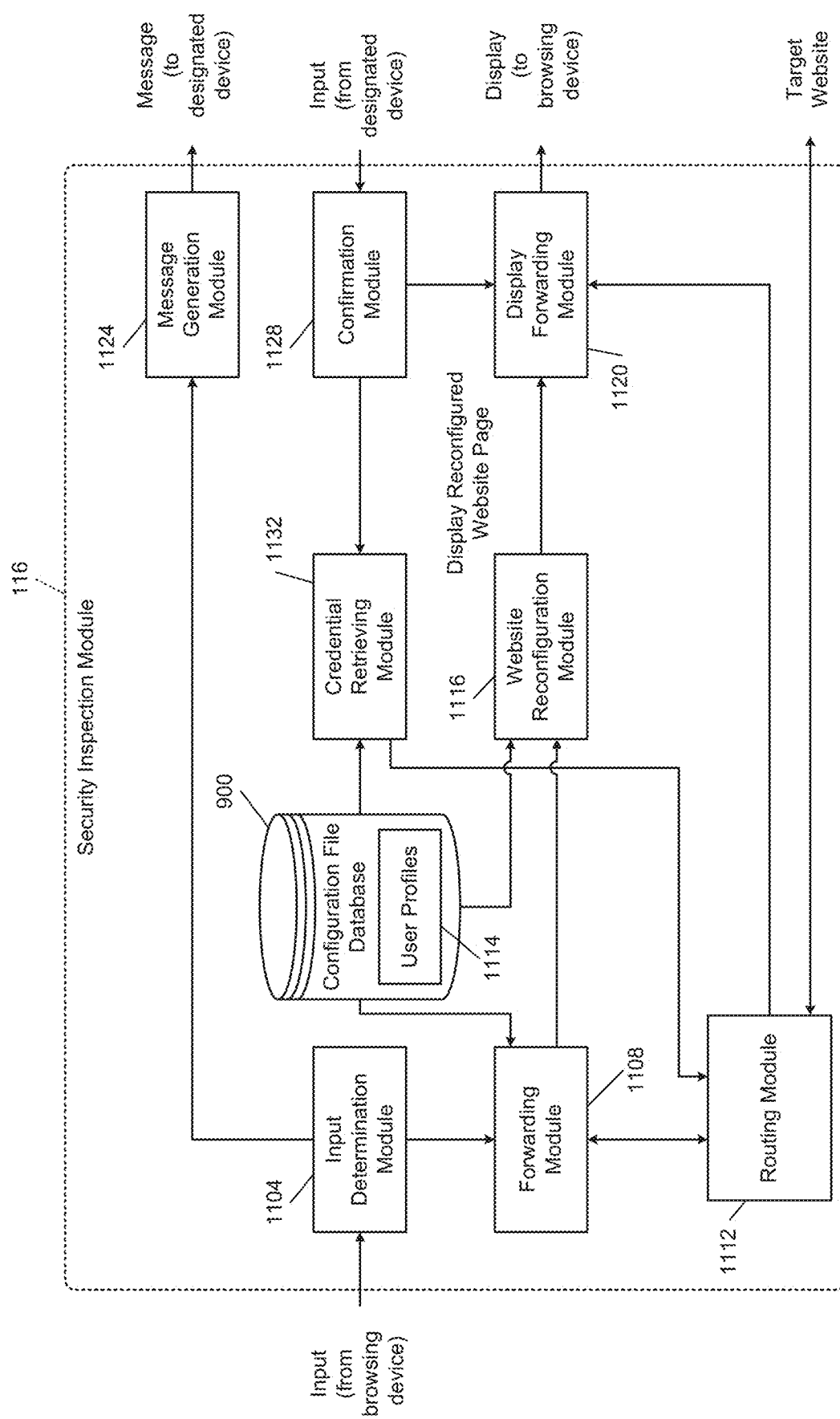
FIG. 11 is a functional block diagram of an example security inspection module.

FIG. 11 is an example functional block diagram of an example security inspection module. The security inspection module 116 includes an input determination module 1104. The input determination module 1104 receives input from the browsing device, such as entering a target website, selecting a link to the target website, selecting a secure login button from the browsing device, etc. The input determination module 1104 determines whether the input from the browsing device is requesting navigation to a website or requesting a secure login based on the target website entered by the user.

If the input determination module 1104 determines the input is requesting navigation to a website, the input is forwarded to a forwarding module 1108, which compares the input to target websites stored in the configuration file database 900. In various implementations, the forwarding module 1108 decrypts the input to determine the target website for comparison to target websites stored in the configuration file database 900.

If the website included in the input does not match one of the configuration files in the configuration file database 900, the forwarding module 1108 forwards the input to a routing module 1112. The routing module 1112 is configured to re-encrypt the input using the certificate authority of the browsing device and forward the request to the target website, for usual user interaction with the target website.

The configuration file database 900 may store user profiles 1114. Each user profile of the user profiles 1114 may have corresponding configuration files for target websites selected by the corresponding user. The user profiles 1114 may correspond to the IP address of the user's browsing device. In various implementations, the user may log in to the security system to access the internet to identify which user profile corresponds to the user.

Otherwise, if the forwarding module 1108 identifies a configuration file stored in the configuration file database 900 that matches the target website included in the input, the forwarding module 1108 marks the input before forwarding the input to the routing module 1112, noting that the response from the target website is to be intercepted to generate a secure, new page. The routing module 1112 re-encrypts and forwards the marked input request.

In response to the routing module 1112 receiving a response for the marked input request from the target website, the routing module 1112 forwards the response to the forwarding module 1108. The forwarding module 1108 identifies the marked response and forwards the response to a website reconfiguration module 1116. Alternatively, the routing module 1112 may identify the marked response and instead directly forward the response to the website reconfiguration module 1116. In various implementations, when the routing module 1112 receives a response from the target website that is not marked, the routing module 1112 forwards the response to a display forwarding module 1120 to display the response on the browsing device.

The website reconfiguration module 1116 obtains the corresponding configuration file, and, more specifically, the corresponding reconfiguration file, from the configuration file database 900 to generate the new page, removing the request for user credentials and replacing the request for user credentials with a user-selectable button. The website reconfiguration module 1116 forwards the new page to the display forwarding module 1120 for display on the browsing device.

If the input is user selection of a secure login button from the browsing device (after the new page is displayed on the browsing device), the input determination module 1104 forwards the input to a message generation module 1124. The message generation module 1124 generates a message to transmit to the designated device. The message may be specifically transmitted to the designated device for viewing through an application on the designated device. The message includes a button for the user to select to approve the login attempt on the designated device to realize two-factor authentication.

The security inspection module 116 includes a confirmation module 1128 configured to receive input from the designated device. The input may be a confirmation or a rejection. If the input is a rejection, the confirmation module 1128 forwards the rejection to the display forwarding module 1120 for display on the browsing device. Otherwise, if the input is a confirmation, the confirmation module 1128 forwards the confirmation to a credential retrieving module 1132. The credential retrieving module 1132 obtains the relevant user credentials (based on the confirmation) from the configuration file database 900. The credential retrieving module 1132 forwards the user credentials for the target website to the routing module 1112 to post the user credentials to the target website and log in the user.

Once logged in, the target website returns the subsequent website page, which is received by the routing module 1112. The subsequent website page is forwarded by the routing module 1112 to the display forwarding module 1120 for display on the browsing device. From there, the user interacts with the website as usual. After login, pages that the user navigates to will be intercepted by the security inspection module 116; however, the forwarding module 1108 will determine that (as long as the subsequent page is not a login or transaction page) the request can be forwarded to the routing module 1112 without the need to mark the request for additional interception and inspection.

Figure 12:
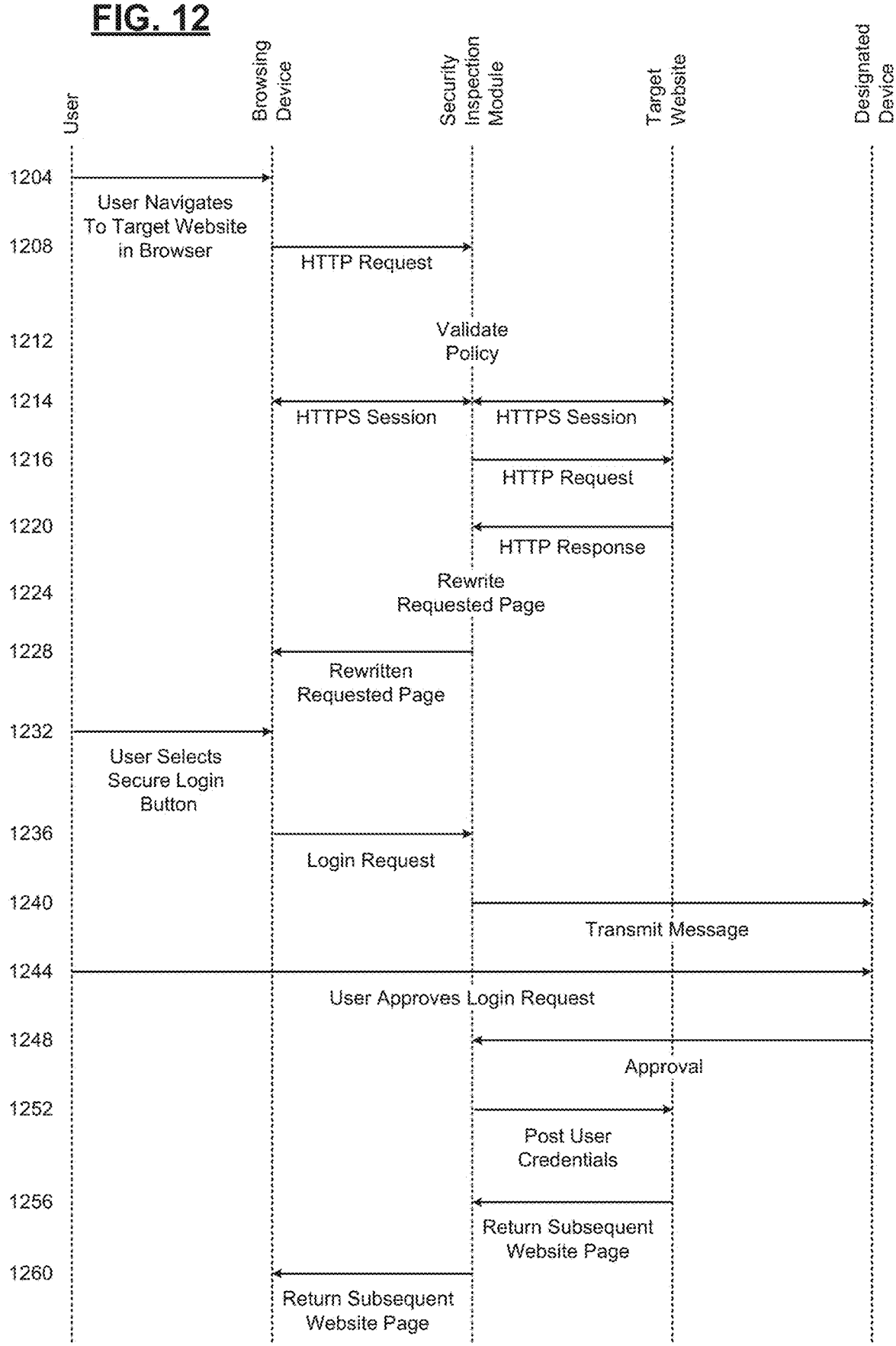
FIG. 12 is a message sequence chart of an example security inspection process.

FIG. 12 is a message sequence chart of an example security inspection process. The user interacts with the browsing device at 1204 to navigate to a target website in a browser. At 1208, the browsing device sends a HTTP request to the target website via the security inspection module. At 1212, the security inspection module validates a corresponding policy. As described above, the security inspection identifies whether the target website requested by the user includes a configuration file to intercept and rewrite the requested website page or generate a new page.

For sites where the security inspection module may be rewriting pages, the security inspection module performs HTTPS interception, and at 1214 establishes HTTPS sessions with both the browsing device and the target website. The security inspection module forwards the HTTP request to the target website at 1216, after noting whether additional interception or interaction with the user request is needed. At 1220, the target website forwards a HTTP response to the security inspection module. Then, at 1224, the security inspection module rewrites the requested website page based on the stored configuration file. As described previously, the rewritten page may remove a login portion requesting user credentials and replace the login portion with a secure login button. At 1228, the security inspection module forwards the rewritten requested page to the browsing device.

At 1232, the user selects the secure login button included on the rewritten requested page. Then, at 1236, the browsing device forwards the login request to the security inspection module. At 1240, the security inspection module generates and transmits a message out-of-band (transmitted independently from in-band data stream) to the designated device.

At 1244, the user selects a confirm button on the designated device to approve the login request. Then, at 1248, the designated device forwards the approval to the security inspection module. The security inspection module posts the user credentials at 1252. As described above, the security inspection module stores user credentials for a variety of target websites. At 1256, the target website returns the subsequent website page, which the security inspection module forwards to the browsing device at 1260.

Figure 13:
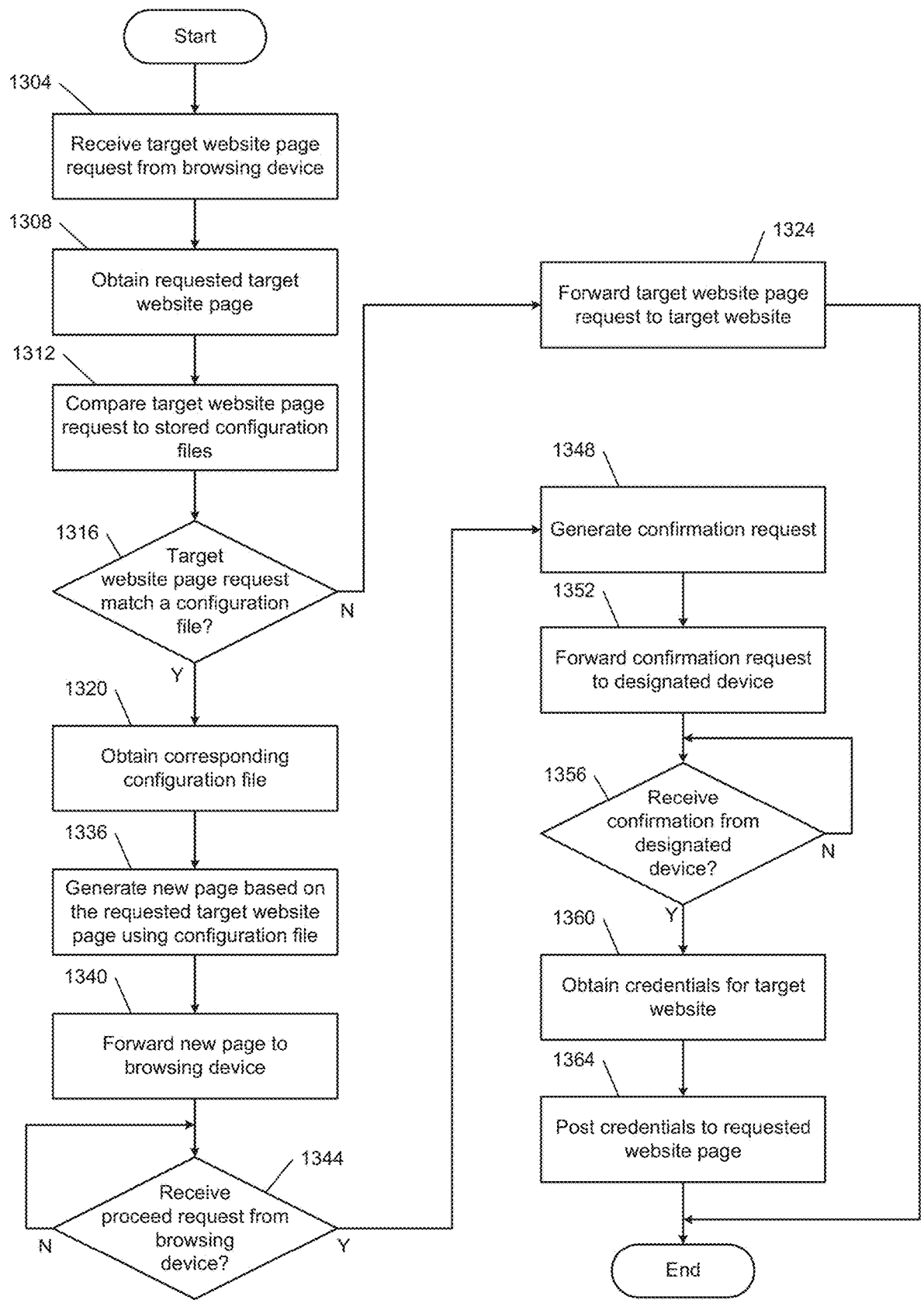
FIG. 13 is a flowchart depicting example security inspection during a login event.

FIG. 13 is a flowchart depicting example security inspection during a login event. Control begins at 1304 upon receiving a target website page request from the browsing device. At 1308, control obtains the requested target website page from the target website. Control continues to 1312 to compare the target website page request to stored configuration files. Control continues to 1316 to determine if the target website page request matches a stored configuration file. If yes, then control continues to 1320 to obtain requested target website page from the target website. Otherwise, control continues to 1324 to forward the target website page request to the target website. Then, control ends.

Returning to 1320, control obtains the corresponding configuration file. The corresponding configuration file is unique to the target website and includes website reconfiguration instructions, a two-factor enabled indication, and user credentials for the target website. Control continues to 1336 to generate a new page based on the requested target website page using the reconfiguration instructions included in the configuration file. Control proceeds to 1340 to forward the new page to the browsing device.

At 1344, control determines whether a proceed request has been received from the browsing device. That is, the new page, including a secure login button, was forwarded to the browsing device at 1340. Then, control waits for user selection of the secure login button at 1344. If no, control waits. Once control receives the proceed request from the browsing device at 1344, control continues to 1348 to generate a confirmation request. The confirmation request includes identifying information about the login request from the browsing device. Then, at 1352, control forwards the confirmation request to the designated device.

At 1356, control determines whether a confirmation has been received from the designated device. If no, control waits. Otherwise, if the confirmation has been received, control continues to 1360 to obtain credentials corresponding to the target website. Control continues to 1364 to post the credentials to the target website page. Then, control ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the internet. For example, the communications system may include multiple LANs connected to each other over the internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   at least one processor and
   a memory coupled to the at least one processor,
   wherein the memory stores:
   a plurality of profiles, wherein each profile of the plurality of profiles corresponds to a page of a set of pages and includes login credentials for the corresponding page; and
   instructions for execution by the at least one processor and wherein the instructions include,
   determining a page identifier based on a page request, in response to receiving the page request from a browsing device;
   comparing the page identifier to the set of pages;
   obtaining a first profile corresponding to a first page of the set of pages of the plurality of profiles, in response to the page identifier matching the first page;
   retrieving the first page from a first website corresponding to the first page;
   generating, based on the first page, a new page according to the first profile such that the system generates the new page by i) identifying a login portion of the first page based on instructions included in the first profile by determining credential field codes associated with the first website based on information in the first profile, and identifying the login portion of the first page based on the determined credential field codes, the login portion including user-interface (UI) elements configured to receive the login credentials from a user of the browsing device, ii) deleting the identified login portion including the UI elements, and iii) inserting a button onto the new page that, upon selection by the user, transmits the selection from the browsing device to the system;
   transmitting the new page to the browsing device;
   forwarding the login credentials of the first profile to the first website, in response to receiving the selection of the button on the new page via the browsing device; and
   forwarding a return page to the browsing device for display on the browsing device, in response to receiving the return page from the first website.

2. The system of claim 1 wherein the first profile of the plurality of profiles includes:
   a reconfiguration file including instructions to generate the new page, and an indication to enable or disable two-factor authentication.

3. The system of claim 1 wherein each of the profiles is implemented as a configuration file.

4. The system of claim 1 wherein the instructions include, in response to the page identifier not matching at least one page of the set of pages of the plurality of profiles:
   redirecting the page request to a corresponding website and not performing HTTPS interception.

5. The system of claim 1 wherein the login credentials include a username and a password associated with the user of the browsing device.

6. The system of claim 1 wherein the instructions include, before forwarding the login credentials of the first profile:
   forwarding a confirmation request to a confirmation device, and
   in response to receiving a confirmation indication from the confirmation device, forwarding the login credentials of the first profile to the first website.

7. The system of claim 6 wherein the browsing device and the confirmation device are at least one of: (i) a mobile phone, (ii) a tablet, (iii) a laptop, and (iv) a desktop.

8. The system of claim 6 wherein the instructions include:
   in response to receiving a rejection indication from the confirmation device, forwarding a rejection screen to the browsing device for display on the browsing device.

9. The system of claim 1 wherein the instructions include:
   in response to the page identifier not matching at least one page of the set of pages, retrieving the first page from the first website and forwarding the first page to the browsing device.

10. The system of claim 1 wherein each profile of the plurality of profiles corresponds to a user identifier.

11. The system of claim 10 wherein the instructions include:
   in response to the page request being received from a first user corresponding to a first user identifier, matching the first page to a subset of pages corresponding to the first user identifier.

12. The system of claim 1 wherein the instructions include:
   in response to the first profile excluding login credentials and including an indication to enable two-factor authentication, retrieving the first page from the first website and forwarding a confirmation request to a confirmation device.

13. A method comprising:
   determining a page identifier based on a page request, in response to receiving the page request from a browsing device, wherein each profile of a plurality of profiles corresponds to a page of a set of pages and includes login credentials for the corresponding page;
   comparing the page identifier to the set of pages;
   obtaining a first profile corresponding to a first page of the set of pages of the plurality of profiles, in response to the page identifier matching the first page;
   retrieving the first page from a first website corresponding to the first page;
   generating, based on the first page, a new page according to the first profile such that the new page is generated by i) identifying a login portion of the first page based on instructions included in the first profile by determining credential field codes associated with the first website based on information in the first profile, and identifying the login portion of the first page based on the determined credential field codes, the login portion including user-interface (UI) elements configured to receive the login credentials from a user of the browsing device, ii) deleting the identified login portion including the UI elements, and iii) inserting a button onto the new page that, upon selection by the user, transmits the selection from the browsing device;
   transmitting the new page to the browsing device;
   forwarding the login credentials of the first profile to the first website, in response to receiving the selection of the button on the new page via the browsing device; and
   forwarding a return page to the browsing device for display on the browsing device, in response to receiving the return page from the first website.

14. The method of claim 13 wherein the first profile of the plurality of profiles includes:
   a reconfiguration file including instructions to generate the new page; and
   an indication to enable or disable two-factor authentication.

15. The method of claim 13 further comprising:
   in response to the page identifier not matching at least one page of the set of pages of the plurality of profiles, redirecting the page request to a corresponding website and not performing HTTPS interception.

16. The method of claim 13 wherein the login credentials include a username and a password associated with the user of the browsing device.

17. The method of claim 13 further comprising, before forwarding the login credentials of the first profile:
   forwarding a confirmation request to a confirmation device; and
   in response to receiving a confirmation indication from the confirmation device, forwarding the login credentials of the first profile to the first website.

18. The method of claim 17 further comprising:
   in response to receiving a rejection indication from the confirmation device, forwarding a rejection screen to the browsing device for display on the browsing device.

19. The method of claim 13 further comprising:
   in response to the page identifier not matching at least one page of the set of pages, retrieving the first page from the first website and forwarding the first page to the browsing device.

* * * * *